(12) United States Patent
Kanamaru et al.

(10) Patent No.: US 7,472,591 B2
(45) Date of Patent: Jan. 6, 2009

(54) THERMAL GAS FLOW AND CONTROL DEVICE FOR INTERNAL-COMBUSTION ENGINE USING THE SAME

(75) Inventors: Yasuhiro Kanamaru, Yokohama (JP); Keiji Hanzawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/781,569

(22) Filed: Jul. 23, 2007

(65) Prior Publication Data
US 2008/0047341 A1  Feb. 28, 2008

(30) Foreign Application Priority Data
Jul. 24, 2006  (JP)  ............... 2006-200472

(51) Int. Cl.
*G01F 1/68* (2006.01)
(52) U.S. Cl. .................................. 73/204.26
(58) Field of Classification Search .............. 73/204.26, 73/204.25, 204.17, 204.15
See application file for complete search history.

(56) References Cited

U.S. PATENT DOCUMENTS 4,001,586 A * 1/1977 Fraioli ........................ 250/345
5,623,097 A * 4/1997 Horiguchi et al. ........ 73/204.15
6,131,453 A * 10/2000 Sultan et al. .............. 73/204.26
6,589,433 B2 * 7/2003 Leung ........................... 216/2

FOREIGN PATENT DOCUMENTS

JP  2880651 B2  1/1999
JP  3698679 B2  7/2005

* cited by examiner

*Primary Examiner*—Jewel Thompson
(74) *Attorney, Agent, or Firm*—Crowell & Moring LLP (57) ABSTRACT

An object of the invention is to realize a thermal gas flow sensor capable of reducing time fluctuation of a heating resistor. A heating resistor 3 and thermometric resistors 4 and 14 are formed on a surface of a thin-wall portion 2. Electrode drawn wires 18 to 23 and pad portions 8 to 13 are formed so as to draw signal lines from the heating resistor 3 and the thermometric resistors 4 and 14. Contact portions 24 to 29 are formed to come in contact with the heating resistor 3, the thermometric resistors 4 and 14, and the electrode drawn wires 18 to 23. The heating resistor 3 and the thermometric resistors 4 and 14 are covered with protective films 30a, 30b, and 31a and insulating films 31b and 30c. The protective films 31a and 31b are formed of a dense film formed of nitride or the like. A part coming in contact with a drawn wire portion 34 and the heating resistor 3 is covered with a contact barrier metal film 36 (titanium-based electrical conductor such as titanium nitride, titanium tungsten, and titanium). The titanium-based electrical conductor is a dense film and resistant to hydrogen. Therefore, it is possible to reduce a time fluctuation of the heating resistor.

8 Claims, 7 Drawing Sheets

THERMAL GAS FLOW AND CONTROL DEVICE FOR INTERNAL-COMBUSTION ENGINE USING THE SAME

BACKGROUND OF THE INVENTION

1. Field of the Invention

The present invention relates to a thermal gas flow sensor in which a heating resistor is formed of a semiconductor thin film.

2. Description of the Related Art

Since thermal gas flow sensors can directly detect a gas mass flow, the thermal gas flow sensors are widely used as a flow meter. Such a flow meter is provided in an electronic control fuel injection device in an internal-combustion engine for a vehicle or the like in order to detect an intake air mass. Further, this type of flow meter is used as a flow meter for various gases used in semiconductor fabrication or hydrogen and oxygen used in a fuel cell.

Among these, a gas flow sensor manufactured by a semiconductor micromachining technology is particularly attractive because of its cost reduction and low operating power.

A conventional gas flow sensor using a semiconductor substrate is described in Japanese Patent No. 2880651 and Japanese Patent No. 3698679. In such documents, a heating resistor is formed of polycrystalline silicon (polysilicon) as a substitute for the conventionally used platinum because of advantages of the polysilicon in heat resistance and material cost.

SUMMARY OF THE INVENTION

When the heating resistor used in thermal gas flow sensor is formed of polysilicon or metals, the sensor's durability depends on a time-fluctuating resistance value of the heating resistor. Thus, it is necessary to suppress the time fluctuation of the resistance value.

Among reasons of the time-varying resistance of the heating resistor, the entering of external hydrogen into the heating resistor has been known to cause the time-varying resistance. For this reason, the heating resistor is covered with a nitride film resistant to hydrogen and is electrically insulated.

However, since a part of a contact hole (via) portion of an electrode wire portion is electrically connected to the heating resistor, it is difficult to electrically isolate the connection part. Thus, a dense film resistant to hydrogen cannot be used to cover the connection part.

For this reason, hydrogen can enter into the heating resistor through the connection part of the heating resistor and the contact hole portion, and the resistance value is varied.

Additionally, the metal (for example, aluminum) constituting the electrode wire portion and the heating resistor (for example, polysilicon) may undergo a silicide reaction, and a resistance-temperature coefficient of the connection part may become unstable. The changing rate of the coefficient may increase as the resistance value fluctuates with time.

An object of the invention is to provide a thermal gas flow sensor capable of reducing a time fluctuation of a heating resistor and a control device of an internal-combustion engine using the same.

A thermal gas flow sensor of the present invention includes a heating resistor, a thermometric resistor provided in the proximity of the heating resistor, and a drawn wire portion electrically connected to the heating resistor on a substrate, in which at least a part of a contact portion in which the heating resistor and the drawn wire portion are electrically connected to each other is covered with an electrical conductor containing nitrides.

A control device of an internal-combustion engine of the present invention includes air-flow measurement means for measuring an air flow supplied to an internal-combustion engine and air-flow control means for controlling the air flow based on the air flow measured by the air-flow measurement means, in which in the air-flow measurement means, at least a part of a contact portion in which the heating resistor and the drawn wire portion are electrically connected to each other is covered with an electrical conductor containing nitrides.

It is possible to realize a thermal gas flow sensor capable of reducing a time fluctuation of a heating resistor and a control device of an internal-combustion engine using the same.

DETAILED DESCRIPTION OF THE PREFERRED EMBODIMENTS

Hereinafter, embodiments of the invention will be described by referring to the attached drawings. Additionally, an example in which the invention is applied to a thermal gas flow sensor will be described in the embodiments.

Figure 1:
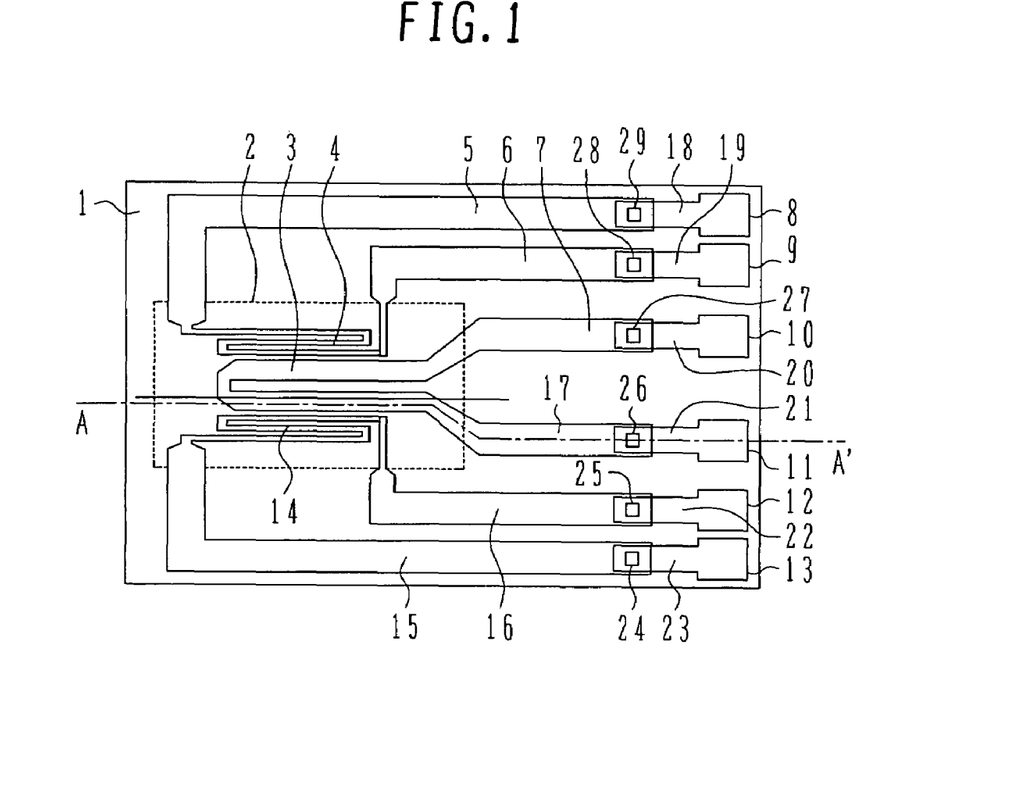
FIG. 1 is a top plan view showing a detection element 1 of a thermal gas flow sensor according to a first embodiment of the invention.
Figure 2:
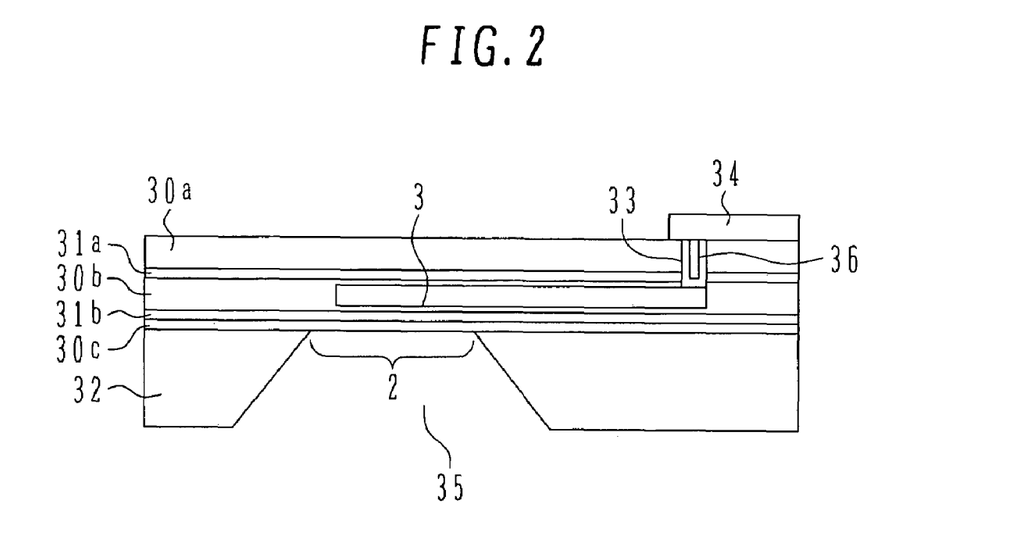
FIG. 2 is a sectional view taken along A-A' line in FIG. 1.
Figure 3:
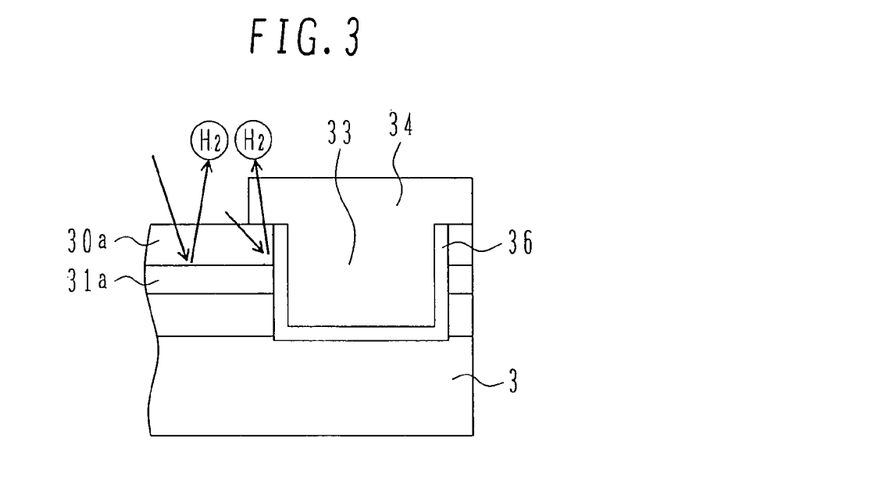
FIG. 3 is an enlarged view showing a contact portion in FIG. 2.

FIG. 1 is a top plan view showing a detection element 1 of a thermal gas flow sensor according to a first embodiment of the invention. FIG. 2 is a sectional view taken along A-A' line in FIG. 1. FIG. 3 is an enlarged view showing a contact portion 33 in FIG. 2.

First, a configuration of the detection element 1 of the thermal gas flow sensor according to the first embodiment of the invention will be described by referring to FIGS. 1 and 2.

As shown in FIGS. 1 and 2, the detection element 1 is configured such that protective films 30a, 30b, and 31a, insulating films 31b and 30c, a heating resistor 3, a thermometric resistor 4, a contact portion 33, a drawn wire portion 34, and a contact barrier metal film 36 are formed on a plate substrate 32 formed of materials such as silicon and ceramic that have good electrical conductivity.

Subsequently, a space 35 is formed below the insulating film 30c by performing an alkali etching on a rear surface of the plate substrate 32 with a KOH solution, a TMAH solution, and the like. A thin-wall portion (diaphragm) 2 is formed on the plate substrate 32.

A heating resistor 3 heated by a predetermined difference from a temperature of a measured air flow and thermometric resistors 4 and 14 (polysilicon, platinum or molybdenum) serving as temperature measurement means formed on both sides of the heating resistor 3 are formed on a surface of the thin-wall portion 2.

Further, the heating resistor 3 is a resistor formed of a polysilicon thin film, a platinum thin film, a molybdenum film, or the like, and the thermometric resistors 4 and 14 detect a temperature at a disposed position based on a resistance variation of the resistors in accordance with a temperature.

Electrode drawn wires 18 to 23 (aluminum (Al), aluminum-silicon alloy (AlSi), or aluminum-silicon-copper alloy (AlSiCu)) and pad portions 8 to 13 connected to the electrode drawn wires 18 to 23 respectively are formed in order to draw signal lines from the heating resistor 3 and the thermometric resistors 4 and 14.

Contact portions 24 to 29 (titanium nitride (TiN), titanium tungsten (TiW), and titanium (Ti)) are formed to be connected to the heating resistor 3, the thermometric resistors 4 and 14, and the electrode drawn wires 18 to 23. Signals are extracted to the outside thereof via the pad portions 8 to 13.

The heating resistor 3 and the thermometric resistors 4 and 14 are covered with the protective film 30a, the protective film 30b, the protective film 31a, the insulating film 31b, and the insulating film 30c. The protective films 31a and 31b are formed of a dense film such as nitride. Because the protective films 31a and 31b are formed of a dense film, it is possible to prevent water or hydrogen from entering into the heating resistor 3.

The contact portions 24 to 29 form a hole through the insulating films 30a, 31a, and 30b, and wire portions (aluminum or aluminum alloy) are formed to be embedded in the hole.

At this time, parts of the contact portion 33 coming in contact with the drawn wire portion 34 and the heating resistor 3 (polysilicon), which come in contact with the heating resistor 3 and protective films 30a, 31a, and 30b (side wall portions of the contact portion 33), are covered with the contact barrier metal film 37 (titanium-based electrical conductor such as titanium nitride, titanium tungsten, and titanium). The titanium-based electrical conductor is a dense film and known to be resistant to hydrogen.

FIG. 3 is a partially enlarged view showing a part of the contact barrier metal film 37 in FIG. 2. As shown in FIG. 3, the contact barrier metal film 37 blocks external hydrogen or the like from entering into the heating resistor 3.

In addition, in the case where the heating resistor 3 such as polysilicon comes in contact with the drawn wire portion 34 such as aluminum, a silicide reaction is caused therebetween. The silicide reaction may increase the time fluctuation of the resistance value. However, the contact barrier metal film 36 is disposed between the heating resistor 3 and the drawn wire portion 34, and thus it is possible to reduce the silicide reaction.

As described above, according to the first embodiment of the invention, it is possible to realize the thermal gas flow sensor capable of reducing the time fluctuation of the heating resistor.

Figure 4:
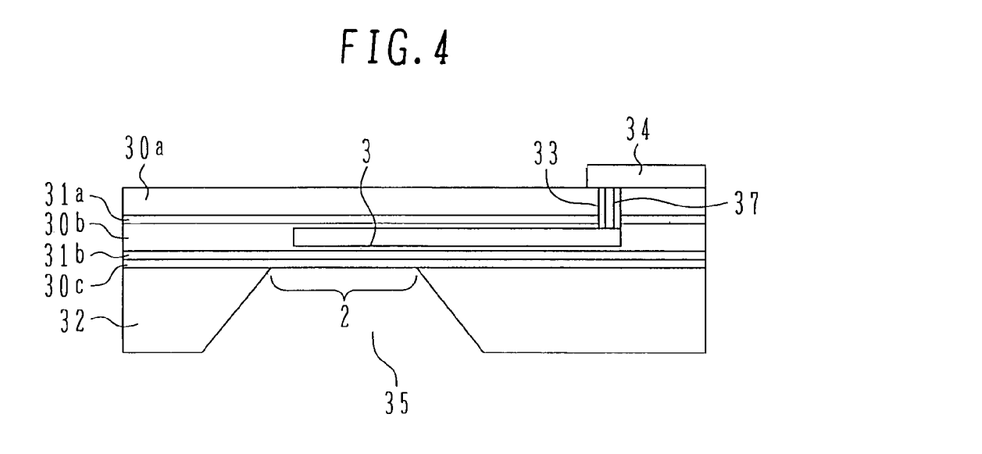
FIG. 4 is a sectional view showing a detection element of a thermal gas flow sensor according to a second embodiment of the invention.
Figure 5:
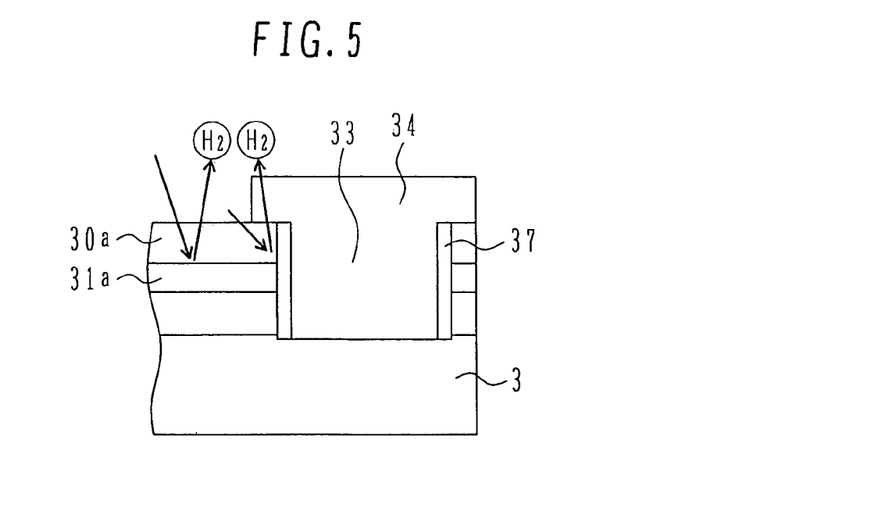
FIG. 5 is an enlarged view showing a contact portion in FIG. 4.

Next, a thermal gas flow sensor according to a second embodiment of the invention will be described by referring to FIGS. 4 and 5. FIG. 4 is a sectional view showing a detection element of a thermal gas flow sensor according to a second embodiment of the invention. FIG. 5 is an enlarged view showing a contact portion in FIG. 4.

Since a sectional configuration of the detection element of the thermal gas flow sensor according to the second embodiment of the invention is almost the same as that of the thermal gas flow sensor according to the first embodiment, a detailed description thereof will be omitted.

In the second embodiment of the invention, the side wall of the contact portion is covered with a nitride film 37, but a bottom wall thereof, that is, a part in which the drawn wire portion 34 and the heating resistor 3 come in contact with each other is not covered with the nitride film 37 (a side wall not coming in direct contact with the heating resistor 3 and the drawn wire portion 34 is covered with an electrical conductor containing nitrides).

According to the configuration of the second embodiment, the entering of external hydrogen is prevented, and thus it is possible to realize the thermal gas flow sensor capable of reducing the time fluctuation of the heating resistor.

Figure 6:
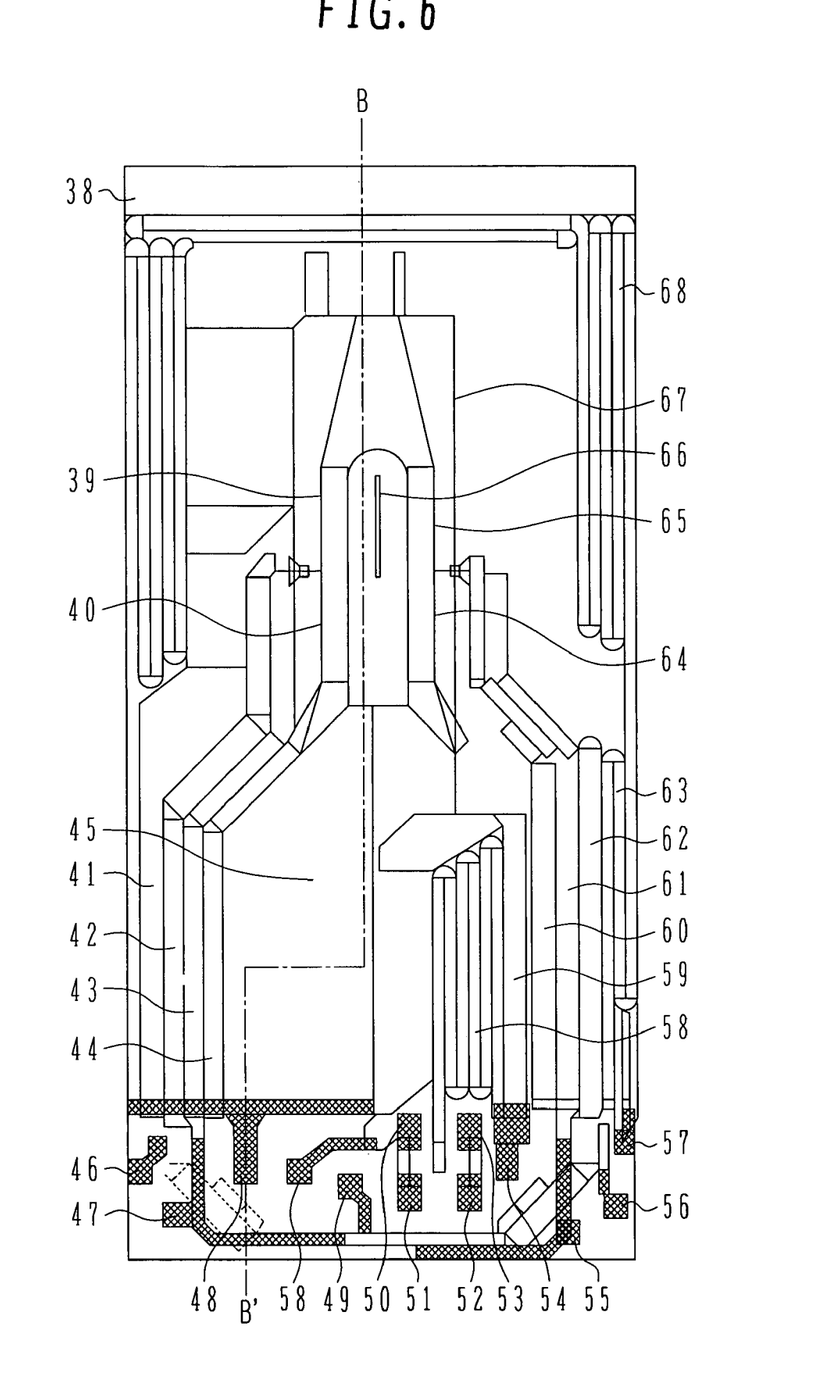
FIG. 6 is a top plan view showing the detection element of the thermal gas flow sensor according to the invention.
Figure 7:
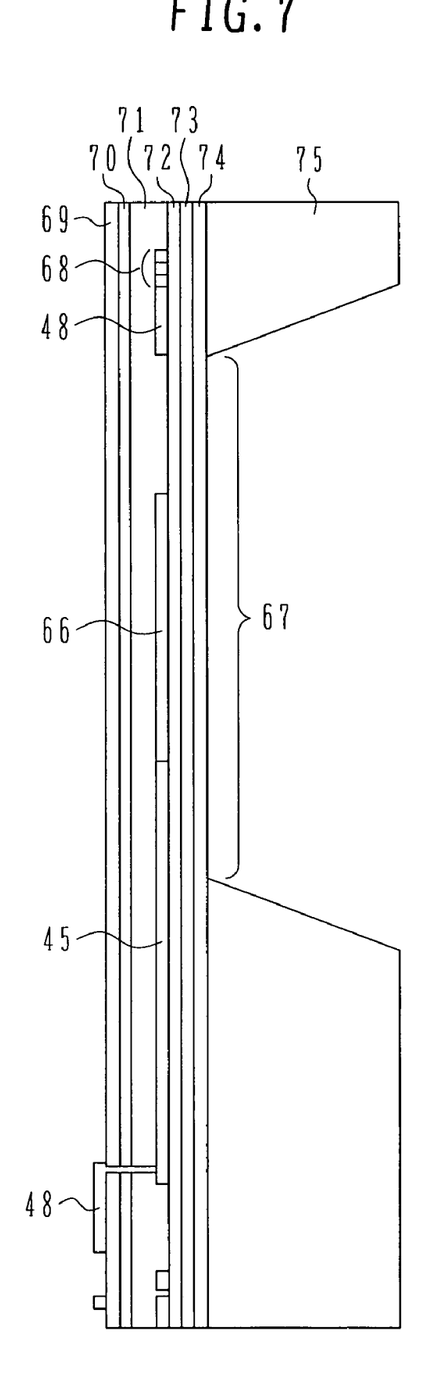
FIG. 7 is a sectional view taken along B-B' line in FIG. 6.
Figure 8:
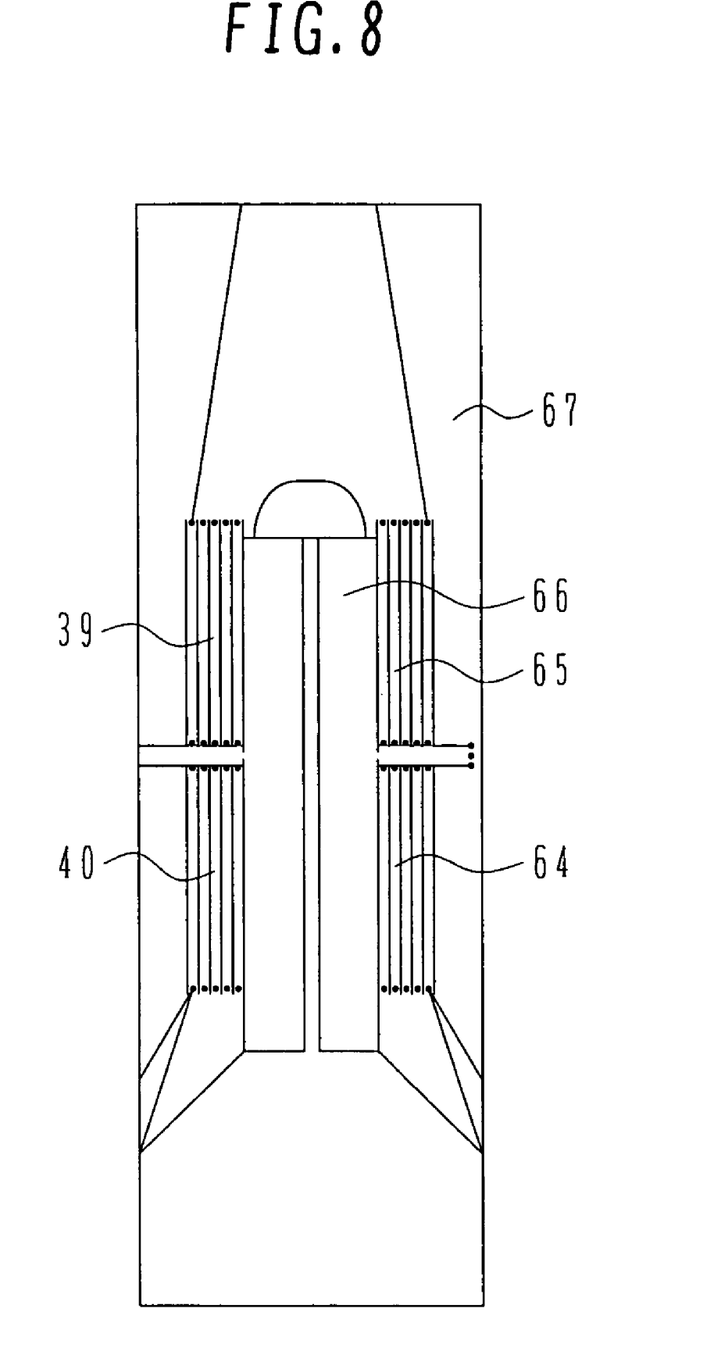
FIG. 8 is a top plan view showing a part related to a heating resistor of the detection element in the thermal gas flow sensor according to the invention.
Figure 9:
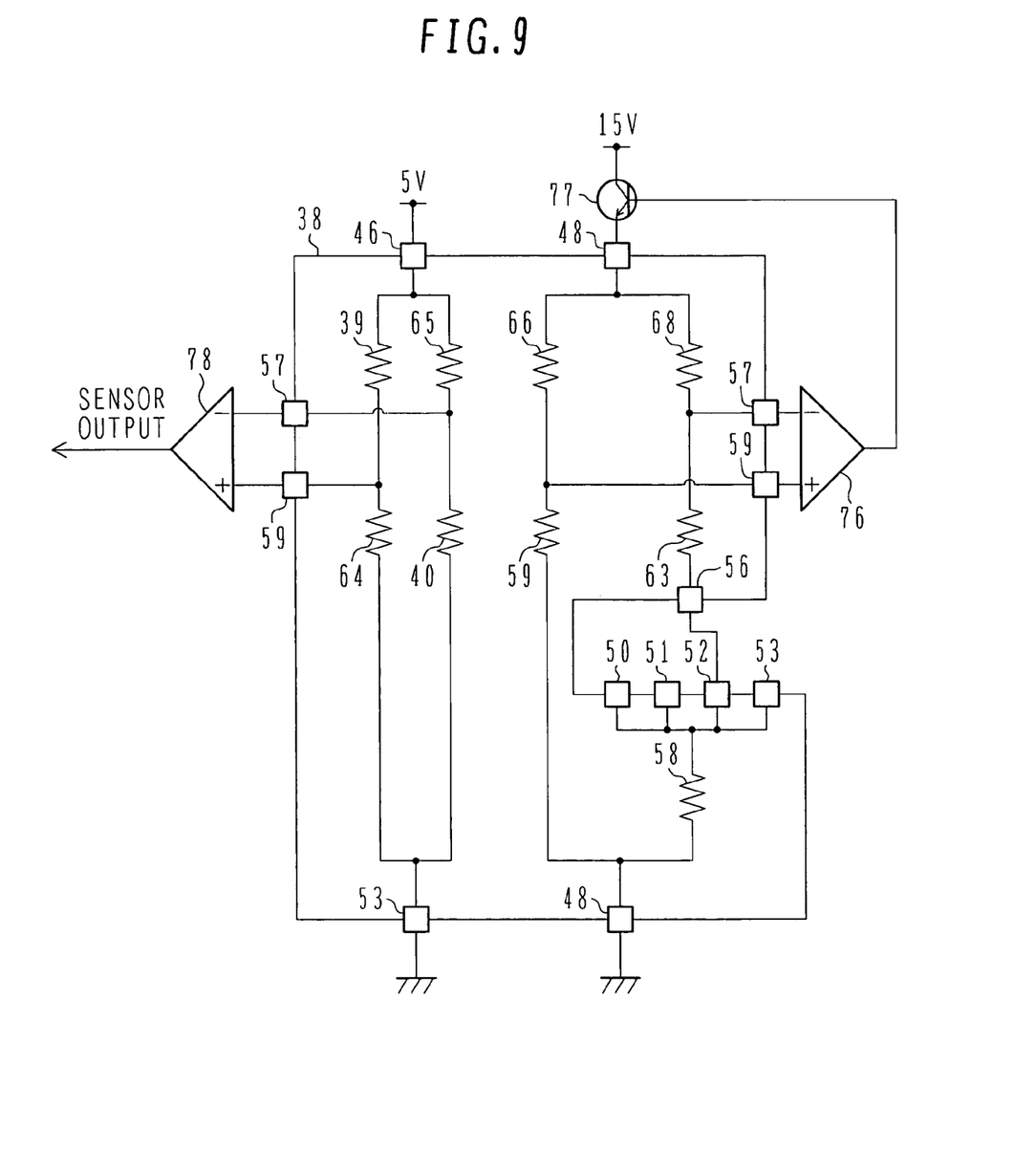
FIG. 9 is a view showing a driving circuit for activating the thermal gas flow sensor according to the invention.

A specific example including a driving circuit with respect to the thermal gas flow sensor of the invention will be described by referring to FIGS. 6 to 9. FIG. 6 is a top plan view showing a detection element 71 of the thermal gas flow sensor according to the invention. FIG. 7 is a sectional view taken along B-B' line in FIG. 6. FIG. 8 is a top plan view showing a part related to a heating resistor 68 of the detection element 38 in the thermal gas flow sensor according to the invention. FIG. 9 is a view showing a driving circuit for activating the thermal gas flow sensor according to the invention.

The detection element 38 of the thermal gas flow sensor according to the invention is formed via the following steps. That is, a silicon oxide film 74, a silicon nitride film 73, and a silicon oxide film 72 are formed on a plate substrate 75 formed of a material such as silicon and ceramic that have good electrical conductivity, and a polysilicon thin film is laminated thereon. A heating resistor 66, an intake-air temperature detecting resistor 68, temperature-difference detecting resistors 39, 40, 64, and 65, and the like are formed thereon by performing a patterning on the polysilicon thin film. Additionally, a silicon oxide film 69, a silicon nitride film 70, and a silicon oxide film 71 are formed as protective films. Then, an aluminum thin film is laminated thereon, and wires and pad portions are formed by performing a patterning on the aluminum thin film.

Further, a space is formed below the silicon oxide film 74 by performing an etching on a rear surface of the plate substrate 75, and a diaphragm (thin-wall portion) 67 is formed on the plate substrate 75. The heating resistor 66 serving as a heating element heated by a predetermined difference from a temperature of a measured air flow and the temperature-difference detecting resistors 39, 40, 64, and 65 serving as detection means are formed on both sides of the heating resistor 66 on the diaphragm 67.

One end of the heating resistor 66 is connected to the pad portion 48 via a drawn wire 45, and the other end thereof is connected to a fixed resistor 59. A contact point of the heating resistor 66 and the fixed resistor 59 is connected to the pad 58, and the other end of the fixed resistor 59 is connected to the pad 58.

The temperature-difference detecting resistors 39, 40, 64, and 65 form a bridge circuit connecting to drawn wires 41, 42, 43, 44, 60, 61, and 62. Contact points of the temperature-difference detecting resistors 39, 40, 64, and 65 are drawn to pad portions 46, 47, 49, and 55, respectively.

Furthermore, the heating resistor 66, the drawn wire 45, the fixed resistor 59, and the temperature-difference detecting resistors 39, 40, 64, and 65 are formed by performing a patterning on the polysilicon thin film. The drawn wires 41, 42, 43, 44, 60, 61, and 62 are formed by performing a patterning on the polysilicon thin film and the aluminum thin film.

The temperature-difference detecting resistors 39, 40, 64, and 65 form a bridge circuit in order to detect a temperature difference between both ends of the heating resistor 66. At this time, if the drawn wires 41, 42, 43, 44, 60, 61, and 62 do not have symmetric property, the bridge circuit generates an output error.

For this reason, the drawn wires 41, 42, 43, 44, 60, 61, and 62 are configured to allow the bridge circuit to be symmetric. In particular, resistance values of the polysilicon thin film part and the aluminum thin film part of the drawn wires 41, 42, 43, 44, 60, 61, and 62 need to be symmetric to each other. A detection element of the invention is configured to have a pattern for allowing the resistance values to be the same.

This is because temperature coefficients of resistance between the polysilicon thin film and the aluminum thin film are largely different. If the resistance values of the polysilicon thin film part and the aluminum thin film part are not symmetric to each other, the output voltage of the bridge circuit causes a large temperature variation.

Additionally, the contact portions are configured to have symmetric sizes and numbers in order to allow the contact portion as a contact part (contact indicated by a black dot in the drawings) of the polysilicon thin film part and the aluminum thin film part of the drawn wires 41, 42, 43, 44, 60, 61, and 62 to be symmetric to one another. At this time, a silicide reaction layer formed by the silicide reaction between polysilicon and aluminum has a different temperature coefficient, and becomes an unstable state.

Large current flows in the heating resistor 66 in order to increase the temperature thereof. At this time, the silicide reaction layer influences the time fluctuation of the resistance value of the heating resistor 66 and thus deteriorates the characteristics of the thermal gas flow sensor. For this reason, it is possible to reduce the time fluctuation of the resistance value by forming the titanium-based electrical conductor in the contact portion.

Next, a driving circuit for activating a detection element 38 according to the invention will be described. The driving circuit includes a differential amplifier 76, a transistor 77, and a differential amplifier 78.

The differential amplifier 76 amplifies an output voltage of a bridge circuit formed of the heating resistor 66, the fixed resistor 59, the intake-air temperature detecting resistor 68, and the fixed resistors 63 and 58 of the detection element 38.

Additionally, the transistor 77 is controlled by the output of the differential amplifier 78 so as to allow current to flow in the heating resistor 66. The differential amplifier 78 outputs a sensor signal after amplifying the output voltage of the bridge circuit formed of the temperature-difference detecting resistors 39, 40, 64, and 65.

The driving circuit controls the current flowing in the heating resistor 66 so as to allow the output voltage of the bridge circuit formed of the heating resistor 66, the fixed resistor 59, the intake-air temperature detecting resistor 68, and the fixed resistors 59 and 58 to be 0.

As described above, the heating resistor 66, the intake-air temperature detecting resistor 68, and the fixed resistors 59 and 58 are formed of the polysilicon thin film, so that the resistance values of the resistors are varied in accordance with the temperature values of the resistors. For this reason, the output voltage of the bridge circuit is varied in accordance with the resistance values and the temperature values of the heating resistor 66, the fixed resistor 59, the intake-air temperature detecting resistor 68, and the fixed resistors 59 and 58. So, the bridge circuit according to the invention is designed to have an output value of 0 when the temperature values of the heating resistor 66 and the intake-air temperature detecting resistor 68 become different by a predetermined temperature value by adequately selecting the resistance values thereof.

With such a configuration, the driving circuit is operated to allow the temperature values of the heating resistor 66 and the intake-air temperature detecting resistor 68 to be different by a predetermined temperature value. Additionally, the temperature values at both sides of the heating resistor 66 are detected by the bridge circuit formed of the temperature-difference detecting resistors 39, 40, 64, and 65. Then, a sensor signal in accordance with an air flow is obtained by amplifying the output voltage of the bridge circuit by using the differential amplifier 78.

Figure 10:
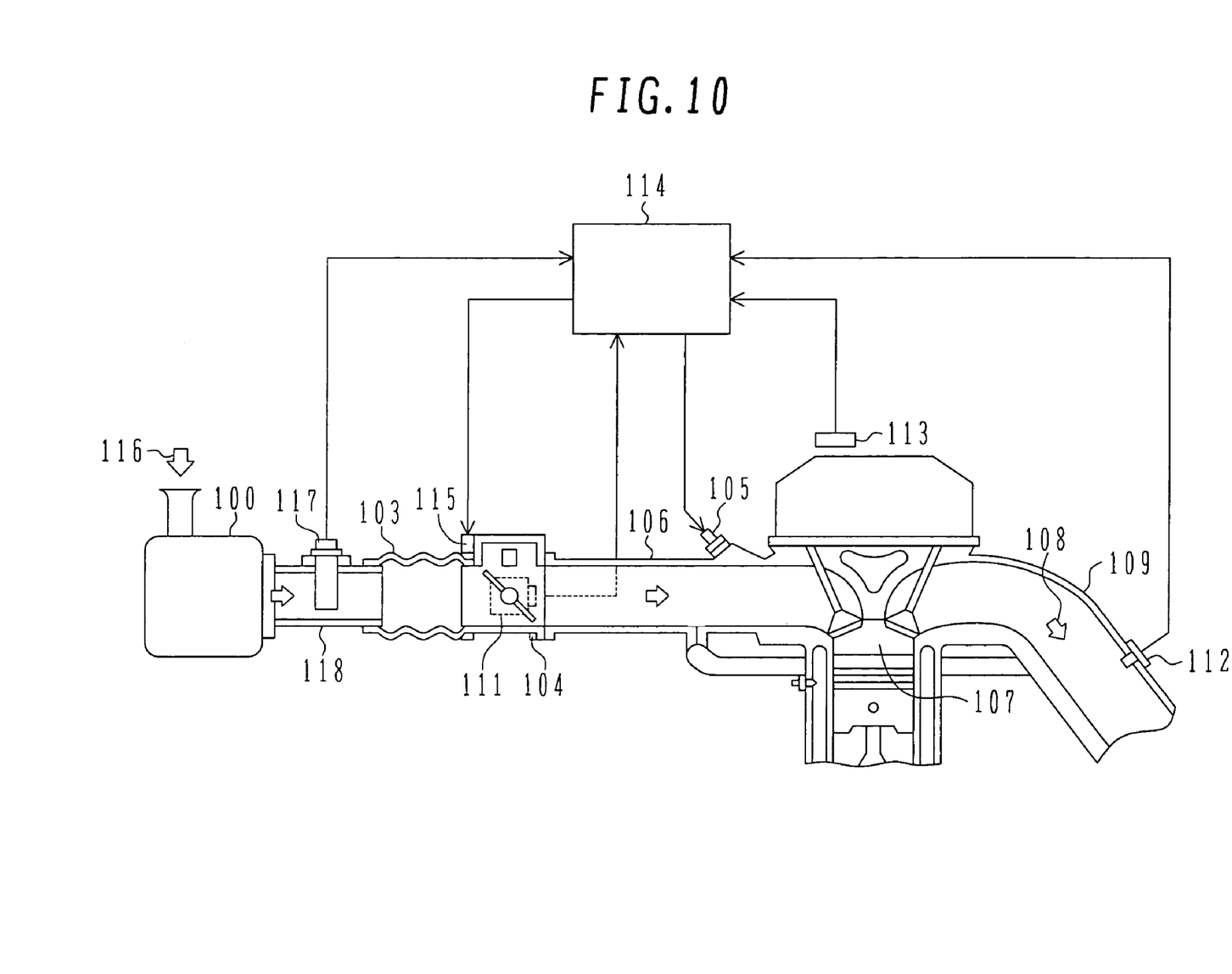
FIG. 10 is a view schematically showing a configuration of a main part of a control device in an internal-combustion engine using the thermal gas flow sensor according to the invention.

FIG. 10 is a view schematically showing a configuration of a main part of a control device in an internal-combustion engine using the thermal gas flow sensor according to the invention, in which the thermal gas flow sensor is described above.

As shown in FIG. 10, intake-air 116 sucked from an air cleaner 100 is supplied to an engine cylinder 107 via a main pipe 118 in which a thermal gas flow sensor 117 is disposed, an air intake duct 103, a throttle body 104, and an intake manifold 106 provided with an injector (fuel injection valve) 105 to which a fuel is supplied. Gas 108 generated from the engine cylinder 107 is discharged to the outside via a discharge manifold 109.

The thermal gas flow sensor 117 is disposed between the air cleaner 100 and the throttle body 104 in an engine room. An air flow signal and an intake-air temperature signal acquired from the thermal gas flow sensor 117, a throttle valve angle signal acquired from a throttle angle sensor 111, an oxygen concentration signal acquired from an oxygen meter 112 provided on the manifold 109, an engine rotation speed signal acquired from an engine tachometer 113, and the like are transmitted to a control unit 114.

The control unit 114 sequentially calculates the received signals to obtain an optimal amount of fuel consumption and an idle air control valve opening, and then controls the injector 105 and an idle air control valve 115 based on the obtained values.

According to the control device of the internal-combustion engine to which the thermal gas flow sensor 117 according to the invention is applied, the time fluctuation of the resistor used in the thermal gas flow sensor 117 is reduced, so that precision of air flow detection is improved. Therefore, it is possible to improve precision of engine control.

Further, although the above-described embodiments are related to the case where the invention is applied to the thermal air-flow sensor, the invention may be applied to a sensor for measuring a gas flow of hydrogen, oxygen and the like, as well as air.

Furthermore, the contact barrier metal film 36 may be formed of a tungsten nitride film. The tungsten nitride film is also dense and known to be resistant to hydrogen.

Moreover, although it is described about the case where the heating resistor and the like are formed on the diaphragm, the invention may be put into practice without necessarily forming the heating resistor on the diaphragm.

What is claimed is:

1. A control device of an internal-combustion engine comprising air-flow measurement means for measuring an air flow supplied to an internal-combustion engine and air-flow control means for controlling the air flow based on the air flow measured by said air-flow measurement means, wherein said air-flow measurement means includes a substrate, a heating resistor, a thermometric resistor provided in the proximity of the heating resistor, a drawn wire portion electrically connected to the heating resistor and provided on the substrate, insulating films containing nitride laminated on said substrate, said heating resistor arranged between said insulating films, said drawn wire portion associated with one of said insulating films, a contact portion hole formed in said one of said insulating films, said contact portion hole penetrating said one of said insulating films; and an electrical conductor film containing nitrides formed on side wall and bottom surface of said contact portion hole, wherein said heating resistor is electrically connected to said drawn wire through said electrical conductor film formed on said side wall and bottom surface of said contact portion hole.

2. A thermal gas flow sensor, comprising:

a substrate;

a heating resistor;

a thermometric resistor provided in the proximity of the heating resistor;

a drawn wire portion electrically connected to said heating resistor and provided on said substrate;

insulating films containing nitride laminated on said substrate, said heating resistor arranged between said insulating films, said drawn wire portion associated with one of said insulating films, a contact portion hole formed in said one of said insulating films, said contact portion hole penetrating said one of said insulating films; and an electrical conductor film containing nitrides formed on side wall and bottom surface of said contact portion hole, wherein said heating resistor is electrically connected to said drawn wire through said electrical conductor film formed on said side wall and bottom surface of said contact portion hole.

3. The thermal gas flow sensor according to claim 2, wherein a contact portion is disposed in the contact portion hole.

4. The thermal gas flow sensor according to claim 2, wherein said drawn wire portion is formed of aluminum (Al), aluminum-silicon alloy (AlSi) or aluminum-silicon-copper alloy (AlSiCu), and at least a part of the contact hole portion is covered with a titanium-based electrical conductor containing titanium nitride (TiN), titanium tungsten (TiW) or titanium (Ti).

5. The thermal gas flow sensor according to claim 2, wherein said heating resistor is formed of polysilicon, platinum, or molybdenum (Mo).

6. The thermal gas flow sensor according to claim 2, wherein said thermometric resistor is formed of a polysilicon, platinum, or molybdenum (Mo).

7. The thermal gas flow sensor according to claim 2, wherein the side wall of the contact portion hole does not come in direct contact with said heating resistor and said drawn wire.

8. The thermal gas flow sensor according to claim 2, wherein a contact part of the contact portion coming in contact with said heating resistor and said side wall thereof is covered with the electrical conductor containing nitrides.

* * * * *